United States Patent [19]

Krulik

[11] Patent Number: 4,786,393
[45] Date of Patent: Nov. 22, 1988

[54] LEAK-FREE PLASTIC FLOW SPACERS FOR ELECTRODIALYSIS APPARATUS AND A METHOD FOR THE MAKING THEREOF

[75] Inventor: Gerald A. Krulik, Laguna Hills, Calif.
[73] Assignee: Morton Thiokol, Inc., Chicago, Ill.
[21] Appl. No.: 54,541
[22] Filed: May 27, 1987

Related U.S. Application Data

[63] Continuation-in-part of Ser. No. 822,076, Jan. 24, 1986.
[51] Int. Cl.$^4$ ............................................. B01D 13/02
[52] U.S. Cl. .................................. 204/301; 204/182.3; 204/182.4
[58] Field of Search .................... 204/301, 279, 182.3, 204/182.4, 182.5, 182.6; 210/321.1

[56] References Cited

U.S. PATENT DOCUMENTS 2,923,676  2/1960  Deming .............................. 204/301
3,933,617  1/1976  Yamamoto et al. ......... 204/182.4 X
4,600,493  7/1986  Korngold ..................... 204/182.4 X Primary Examiner—John F. Niebling
Assistant Examiner—John S. Starsiak, Jr.
Attorney, Agent, or Firm—Gerald K. White

[57] ABSTRACT

An improved electrodialysis stack and method of making the same wherein the border surface areas of the flow spacer frames are microroughened, as by chemical etching, sandblasting, with a patterned mold or embossing, the peripheral inner edges of the frame border are machined smooth, the microroughened border surface areas are coated with a thin layer of inert grease such as silicone, and placed under pressure with other electrodialysis components to form a closed system closely packed and essentially solid stack which is free from cross leakage between compartments and seepage therefrom.

24 Claims, 1 Drawing Sheet

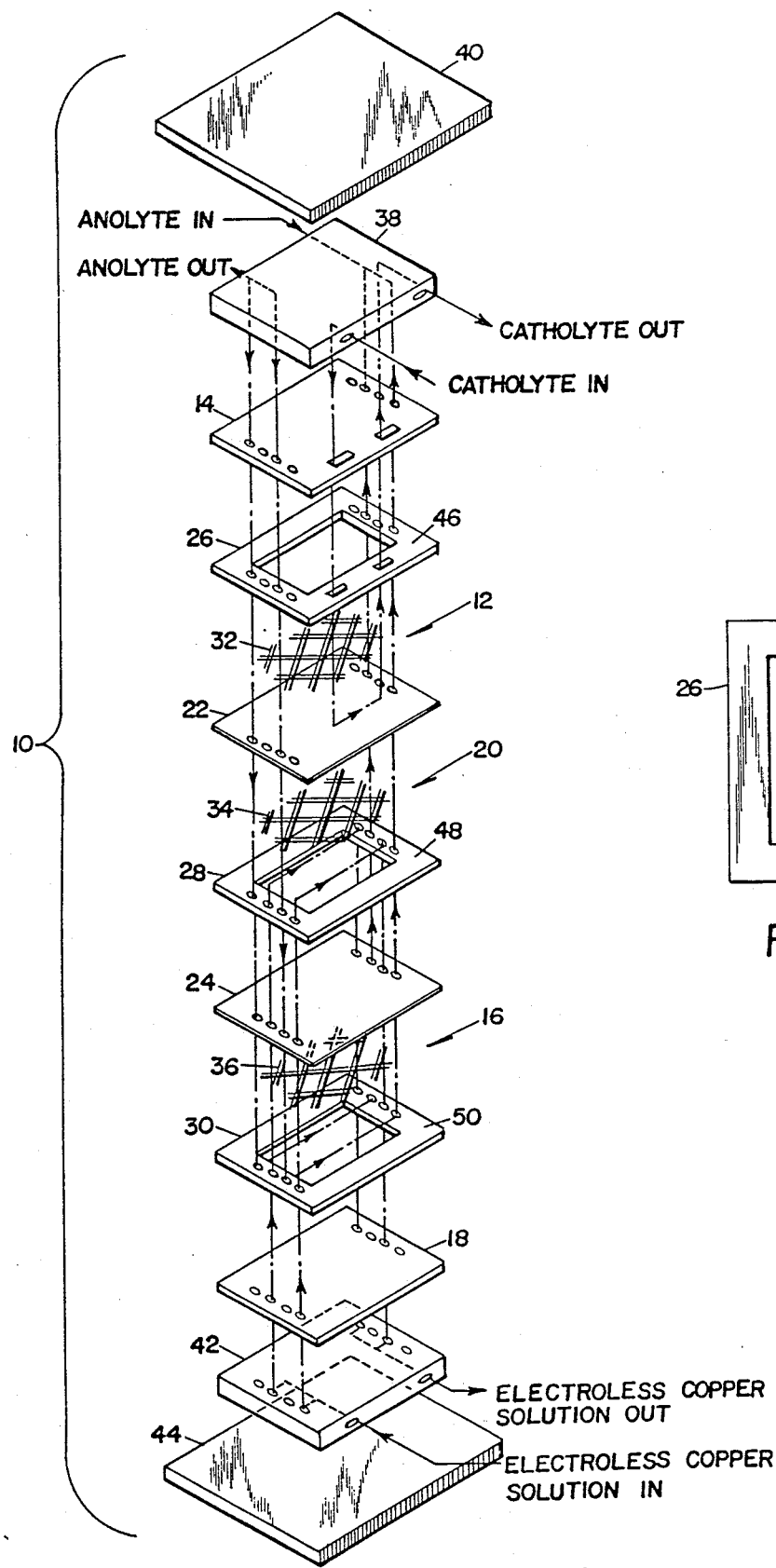
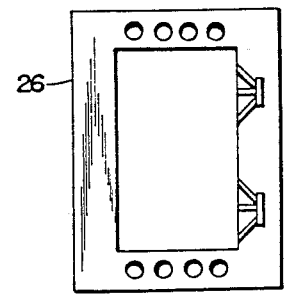
Fig. 2
Fig. 1

LEAK-FREE PLASTIC FLOW SPACERS FOR ELECTRODIALYSIS APPARATUS AND A METHOD FOR THE MAKING THEREOF

This is a continuation-in-part of application Ser. No. 822,076, filed Jan. 24, 1986.

BACKGROUND OF THE INVENTION

1. Field of the Invention

This invention relates to electrodialysis apparatus including alternated layers of metal electrodes, flow spacers, and permselective membranes, all pressed tightly together in a stack. In such apparatus different liquids under pressure flow through separate chambers. As a consequence, leak-free operation is an essential requirement.

2. Description of the Prior Art

Electrodialysis apparatus has been used for the concentration or the demineralization of electrolytes from diverse solutions containing electrolytes such as saline water, electroplating waste, radioactive waste, organic acid solutions and the like. In such electrodialysis apparatus, it is quite important to prevent leakage of the different liquids from one cell compartment to another since such leakage may cause contamination of the dialyzed liquid and render the electrodialysis operation inoperable or diminish its efficiency. It is important, also, to prevent external leakage, as from the areas between the cell compartments, particularly where the liquids may have acid, alkali or other toxic properties contaminating to the environment.

Various proposals have been made in the prior art for preventing leakage of the liquids between and from cell compartments in electrodialysis apparatus. Thus, the use of multi-ply membrane spacers is disclosed in U.S. Pat. No. 3,878,086 issued to David B. Haswell et al. on Apr. 15, 1975 and in U.S. Pat. No. 4,319,978 issued to William G. Millman on Mar. 16, 1982. In U.S. Pat. No. 3,878,086 the outer plies are selected to be more rigid than those in the interior and are held together by a water-resistant pressure-sensitive adhesive. The resultant spacer is adhesively bonded to membranes on each of the sides thereof. The plies in U.S. Pat. No. 4,319,978 are held together by a water-resistant pressure sensitive adhesive with the outer plies being made of compressible material and those in the interior of more rigid material. The spacer so formed is assembled in a stack without being adhesively bonded to the membranes thus facilitating disassembly of the stack for servicing without tearing of the membranes that tends to result when the membranes are adhesively bonded to the spacer as in U.S. Pat. No. 3,878,978.

In U.S. Pat. No. 3,933,617 issued to Tosinori Yamamoto et al., low leakage of liquid between the cells of a filter-press type electrodialysis apparatus is attributed to the feeding and discharge means of the cell being formed separately from the body of the cell frame and made of a rigid material having a thickness preferably less than that of the cell frame. The cell frame is formed of elastic material whereby, upon assembly, the cell frames are compressed while the feeding and discharge means are substantially noncompressed.

U.S. Pat. No. 4,217,200 issued to Ora Kedem et al. on Aug. 12, 1980 discloses a membrane unit for use in electrodialysis apparatus comprising a heat-sealable frame framing and forming an integral entity with an electrodialysis membrane.

U.S. Pat. No. 4,303,493 issued to Klemens Kneifel et al. on Dec. 1, 1981, discloses sealing layers or coatings of foamed epoxy resin applied by a screen printing method adjacent or adjoining sealing surfaces of the sealing frame such as the chamber bores and supply and discharge channels.

In U.S. Pat. No. 4,600,493 granted on July 15, 1986, to Emmanuel Korngold for Electrodialysis Apparatus for the Chemical Maintenance of Electroless Copper Plating Baths and assigned to the assignee of the present invention, the disclosure of which patent, by reference, is incorporated herein, there is disclosed an electrodialysis apparatus comprising alternated layers of metal electrodes, Teflon flow spacers and thin Teflon gaskets, all pressed tightly together. (The generic name for Teflon, which is a trademark of E. I. DuPont deNemours and Company, is tetrafluoroethylene.) High pressure liquids of three types flow through the separate compartments of the apparatus, the Teflon gaskets being provided to preclude leakage.

Such prior art arrangements for achieving leak-free operation are characterized by a number of disadvantages. They are overly complicated requiring additional components such as separate gaskets or other sealing layers or complicated structures including, in some cases, water-resistant pressure sensitive adhesives that add undesirably to the cost of manufacture and assembly and disassembly when necessary for servicing, and moreover, tend to increase the likelihood of operation failure.

Thus, there exists a need and a demand in the art for simplification and improvement in electrodialysis apparatus to the end of achieving leak-free operation which is necessary for the successful commercial operation of the apparatus. The present invention was devised to fill the technological gap that exists in this respect.

SUMMARY OF THE INVENTION

An object of the invention is to provide an improved leak-free electrodialysis apparatus flow spacer frame structure and a method for the making thereof.

Another object of the invention is to provide an improvement in a flow spacer frame structure used in electrodialysis apparatus, which structure imparts leak-free operation of the apparatus in a simple and efficient, cost-effective, way.

Still another object of the invention is to provide such an improvement in flow spacer frame structures for electrodialysis apparatus that enables a significant reduction in the cost of manufacture and assembly of the apparatus, and that facilitates disassembly of the apparatus for servicing, when and if necessary, while minimizing any tendency to damage of the membranes or other apparatus components.

A further object of the invention is to provide such an improvement to the flow spacer frame structures for electrodialysis apparatus that enables the elimination of the Teflon gaskets that are provided in the aforementioned patent of Emmanuel Korngold thereby significantly reducing the number of components that are required. This becomes of particularly significant importance in the commercial scale up of the apparatus.

In accomplishing these and other objectives in one embodiment of the present invention, the flow spacer frame structures of the electrodialysis apparatus, which apparatus may be similar to that disclosed in the aforementioned Korngold patent, are made of Teflon with the border portion surfaces of the frames being microroughened, as by etching, and coated with a thin layer of an inert grease such as silicone grease. The etching may be effected by known means, for example, chemical means such as those that are employed in the printed circuit industry to microroughen nonconductive articles, particularly plastic articles employed as substrates for printed circuit boards, to provide bonding sites for electroless copper plating. Typically, such etching is an inorganic etching with a strong acid or base.

In a preferred embodiment, the improved electrodialysis flow spacer frame structures of the present invention are made by a method involving the steps of:

(a) etching both sides of a Teflon workpiece or blank having the desired thickness and outer dimensions desired for the flow spacer frame;

(b) cutting out a window in the etched workpiece with the dimensions of the window being those desired for the electrodialysis apparatus flow space, leaving a substantial border portion surface surrounding the window;

(c) machining the inner peripheral edges of the border portion of the etched workpiece to provide smooth surfaces thereat; and (d) coating the etched border portion surfaces of the workpiece with a thin layer of an inert grease such as silicone grease.

When the flow spacer frame structure resulting from the practice of this method according to the present invention is placed under pressure in face-to-face relation with a substantially identical flow frame structure coated with a thin layer of inert grease on the adjacent etched border portion surfaces of the frame structures and with an electrodialysis permselective membrane therebetween, a leak-free seal is obtained between the permselective membrane and the adjacent etched border portion surfaces of the flow spacer frame structures even though only moderate pressure is used to compress the frame structures together.

Such a leak-free seal is also obtained when the resulting flow spacer structure is placed under similar pressure in face-to-face relation with a dimensionally stable and planar metallic cathode or anode or with a Teflon or other plastic planar end plate used in an electrodialysis assembly for holding the various components together under pressure in stacked relation.

Being smooth as a result of the machining thereof, the inner peripheral edge surfaces of each such flow spacer frame are substantially free of any tendency for the electrodeposition thereon of metal involved in the operation of the electrodialysis apparatus, for example, the plating out of copper thereon in an electrodialysis apparatus used for the chemical maintenance of electroless copper plating baths.

In another contemplated embodiment of the invention, a Teflon flow spacer frame with a window machined therein may have the border portion surfaces on both sides thereof microroughened, as by etching, following which etching the inner peripheral edges of the border portion may be machined to provide smooth surfaces thereat, and the etched border surfaces coated with a thin layer of silicone grease. The flow spacer frame structure produced according to this method is substantially identical to that produced according to the method first described above and is operable to provide a leak-free seal in electrodialysis apparatus, as above described.

In accordance with the invention, plastic materials other than chemically etched Teflon may be employed as the material for the electrodialysis flow spacer frame structure material. One such alternative material that has been utilized successfully for this purpose in another preferred embodiment of the invention is polypropylene. The polypropylene frame structure material was highly sandblasted to reproduce, that is to copy closely or mimic, the chemically-etched microroughened border surfaces of the Teflon flow spacer frame structures, inasmuch as no good chemical etch method is known for polypropylene. The degree of sandblasting can be selected over a wide range of microroughness. A very light sandblast was found to fairly well duplicate the chemically etched Teflon surface.

Additional plastic materials contemplated for use in the electrodialysis flow spacer frame structures include polyethylene, polyvinyl chloride, other halogenated polymers, epoxies, polyacrylates, etc.

Other ways to microroughen the surface of the plastic flow spacer frame structures include plasma etching, sandblasting (in the generic sense since solid particles other than sand may be used); molding in the surface microroughening with a patterned mold; or embossing a microroughened surface onto the plastic frame structure.

Thus, viewed in a broader aspect, the improved electrodialysis flow spacer structures of the present invention are made by a method involving the steps of:

(a) microroughening both sides of a plastic flow spacer workpiece or blank having the desired thickness and outer dimensions desired for the flow spacer frame;

(b) cutting a window in the microroughened workpiece with the dimensions of the window being those desired for the electrodialysis apparatus flow space, leaving a substantial border portion surface surrounding the window;

(c) machining the inner peripheral edges of the border portions of the microroughened workpiece to provide smooth edges thereat; and (d) coating the microroughened border portion surfaces of the workpiece with a thin layer of an inert grease.

It is contemplated that a plastic flow spacer frame with a window machined therein may have both sides of the border portions thereof microroughened, following which microroughening the inner peripheral edges of the border portions may be machined to provide smooth surfaces thereat, and the microroughened border portions coated with a thin layer of an inert grease such as silicone grease.

In favorable cases it has been found that the coating of silicone or other inert grease may be eliminated. The microroughened surface makes sufficiently good contact with the membrane separators to eliminate all leakage. The microroughened surface itself appears to mold into the membrane separators thus dispensing with the need for a coating of silicone or other inert grease as an additional sealant.

The various features of novelty which characterize the invention are pointed out with particularity in the claims annexed to and forming a part of this specification. For a better understanding of the invention, its operating advantages, and specific objects attained by its use, reference is made to the accompanying drawings and descriptive matter in which a preferred embodiment of the invention is illustrated.

BRIEF DESCRIPTION OF THE DRAWINGS

With this summary of the invention, a detailed description follows with reference being made to the accompanying drawings which form part of the specfication, of which:

FIG. 1 is a schematic exploded view illustrating a single electrodialytic cell unit utilizing the leak-free etched Teflon flow spacer structure according to the present invention; and FIG. 2 is a plan view of one of the leak-free etched Teflon flow spacer structures of FIG. 1.

DETAILED DESCRIPTION OF THE PREFERRED EMBODIMENT

Referring now to the drawings and more particularly to FIG. 1 thereof, an apparatus comprising a three-compartment electrodialytic cell 10 for chemically maintaining an electroless copper plating bath is shown as including a cathode compartment 12 which contains a dimensionally stable planar cathode electrode 14, an anode comparment 16 which contains a dimensionally stable planar anode electrode 18, and an intermediate electroless copper or regenerating compartment 20. Compartment 20 is defined by anion permselective membranes 22 and 24 which separate the electroless copper compartment 20 from the cathode compartment 12 and the anode compartment 16, respectively. A first flow spacer frame 26, a plan view of which is shown in FIG. 2, separates membrane 22 from cathode 14. A second similar flow spacer frame 28 separates membrane 22 from membrane 24. A third similar flow spacer frame 30 separates membrane 24 from the anode 18. The three flow spacer frames may be substantially identical except for the arrangement of flow passageways or ports through the border portions thereof as required for the passage of different solutions in each of the three compartments 12, 16 and 20, in a manner known in the art and fully explained in the aforementioned Korngold patent.

While, for convenience of illustration, the several components of the electrodialytic cell have been shown in spaced apart relation in FIG. 1, it will be understood that in a practical embodiment thereof these components would be arranged in a closed system in a closely packed and essentially solid relation, with perforated spacers 32, 34 and 36 positioned in the window opening of frames 26, 28 and 30, respectively, providing physical support for the membranes 22 and 24. For maintaining the electrodialytic cell 10 in such closely packed relation there is provided at the cathode end of the stack a plastic press block 38 and a steel backup plate 40. A similar plastic press block 42 and steel backup plate 44 are provided at the anode end of the stack. Suitable steel rods (not shown) extending between the steel plates 40 and 44 may be provided to hold various components of the electrodialytic cell together under pressure.

In accordance with the invention, the borders surfaces of each of the flow spacer frames 26, 28 and 30 are conditioned as by etching, sandblasting, molding or embossing in known manner, as described hereinbefore, to provide thereon, on both sides of the border, microroughened surfaces, for example, that are visibly roughened when viewed under a 10× lens. The microroughened border surfaces of frames 26, 28 and 30 that are visible in FIG. 1 of the drawing have been designated by reference number 46, 48 and 50, respectively. It will be understood that the opposite sides of frames 26, 28 and 30 that are not visible in the drawing are also microroughened by etching.

Before assembly of the electrodialytic cell 10, the etched or roughened border surfaces on both sides of the frames 26, 28 and 30 are coated with a thin layer of an inert grease, silicone grease being preferred since it has been found to coat the etched border surfaces uniformly and reliably.

When the resulting flow spacer frame structures 26, 28 and 30 are assembled to form an electrodialytic cell such as the electrodialytic cell 10, and placed under pressure, as shown, in face-to-face relation with the anion perselective membranes 22 and 24, the cathode electrode 14 and the anode electrode 18, a leak-free seal is obtained between the permselective membranes 22 and 24 and the respectively associated frame structures 26, 28 and 28, 30, between frame structure 26 and cathode electrode 14, and between frame structure 30 and anode electrode 18. In an operative embodiment of the invention no leaks of any kind were found, even though only moderate pressure was used to compress the electrodialysis stack.

It will be understood that, if desired, the border surfaces of the plastic blocks 38 and 42 adjacent the respectively associated cathode electrode 14 and anode electrode 18 may also be microroughened and coated with silicone grease, particularly in the region therein for the passageways or ports that are provided therein for the flow of the various solutions, thereby to preclude any leakage or seepage in these regions.

Thus, in accordance with the invention, there has been provided an improved leak-free electrodialysis apparatus flow spacer frame structure and a method for the making thereof. The improved flow spacer frame structure is characterized not only by the relative ease of manufacture thereof in a simple, efficient and cost-effective way, but also by the ability thereof to impart leak-free operation to the cell while enabling the use of Teflon sealing gaskets as used in the prior art to be dispensed with. While the invention has been illustrated in the drawing in connection with use thereof in a single electrodialytic cell, it will be understood it may be employed efficaciously in electrodialysis apparatus made up of a number of electrodialytic cells that may be connected in series, parallel, or series-parallel arrangements in a manner known in the art.

With this description of the invention in detail, those skilled in the art will appreciate that modifications may be made in the invention without departing from the spirit thereof. Therefore, it is not intended that the scope of the invention be limited to the specific embodiment illustrated and described. Rather, it is intended that the scope of the invention be determined by the appended claims and the equivalents thereof.

What is claimed is:

1. The method of making a plastic flow spacer frame for an electrodialysis apparatus, said flow spacer frame having two sides and having border portions including inner peripheral edges surrounding a window having dimensions of the size desired for the electrodialysis apparatus, comprising the steps of:
   (a) microroughening both sides of the border portions of said flow spacer frame,
   (b) machining the inner peripheral edges of the border portions of said flow spacer frame to provide smooth surfaces thereat, and (c) coating the microroughened border portions of said flow spacer frame with a thin layer of inert grease, whereby, when the resulting flow spacer frame is placed under pressure in face-to-face relation with a substantially identical flow spacer frame with a permselective membrane therebetween, a leak-free seal is obtained between the permselective membrane and the adjacent etched border portions of said flow spacer frame with the smooth inner peripheral edge surfaces of said flow spacer frames being substantially free from any tendency of the electrodeposition thereon on metal involved in the operation of the electrodialysis apparatus.

2. A method as set forth in claim 2 wherein the microroughening of both sides of the border portions of said flow spacer frame is effected by sandblasting.

3. A method as set forth in claim 2 wherein the material of which said plastic flow spacer frame is made is polypropylene.

4. A method as set forth in claim 3 wherein the inert grease is silicone grease.

5. A method as set forth in claim 2 wherein the microroughening of both sides of the border portions of said flow spacer frame is effected by molding in a microroughened surface with a patterned mold.

6. A method as set forth in claim 2 wherein the microroughening of both sides of the border portions of said flow spacer frame is effected by embossing a microroughened surface onto the flow spacer frame structure.

7. The method of making a flow spacer frame for an electrodialysis apparatus comprising the steps of:
(a) microroughening both sides of a plastic workpiece having the desired thickness and outer dimensions desired for the flow spacer frame,
(b) cutting out a window in the microroughened workpiece with the dimensions of the window being those desired for a flow spacer in the electrodialysis apparatus and leaving a border portion having inner peripheral edges and a substantial border portion surface surrounding the window,
(c) machining the inner peripheral edges of the border portion of the microroughened workpiece to provide smooth surfaces thereat, and
(d) coating the microroughened border portion surfaces of said workpiece with a thin layer of inert grease, whereby, when the resulting flow spacer frame is placed under pressure in face-to-face relation with a substantially identical flow spacer frame with a permselective membrane therebetween, a leak-free seal is obtained between the permselective membrane and the adjacent microroughened border portion surfaces of said flow spacer frames with the smooth inner peripheral edge surfaces of said flow spacer frames being substantially free from any tendency for the electrodeposition thereon of metal involved in the operation of the electrodialysis apparatus.

8. A method as set forth in claim 7 wherein the inert grease is silicone grease.

9. In electrodialysis apparatus comprising fluid containing cells formed of alternate membranes and frame members having border surfaces and stacked and pressed together in face-to-face relation to form a consolidated apparatus, the improvement wherein the border surfaces of adjacent frame members are microroughened and coated with an inert grease for precluding leakage or seepage of fluid between and from said cells of said apparatus.

10. In electrodialysis apparatus as set forth in claim 9 wherein said frame members are made of tetrafluoroethylene and the microroughened border surfaces of adjacent frame members are chemically etched surfaces.

11. In electrodialysis apparatus as set forth in claim 9 wherein said frame members are made of polypropylene and the microroughened border surfaces of adjacent frame members are sandblasted surfaces.

12. In electrodialysis apparatus as set forth in claim 9 wherein said frame members are made of a plastic and the microroughened border surfaces of adjacent frame members are molded in surfaces.

13. In electrodialysis apparatus as set forth in claim 9 wherein said frame members are made of a plastic and the microroughened border surfaces of adjacent frame members are embossed surfaces.

14. The method of making a flow spacer frame for an electrodialysis apparatus, said flow spacer frame having two sides and having border portions including inner peripheral edges surrounding a window having dimensions of the size desired for the electrodialysis apparatus, comprising the steps of:
(a) etching both sides of the border portions of said flow spacer frame,
(b) machining the inner peripheral edges of the border portions of said flow spacer frame to provide smooth surfaces thereat, and
(c) coating the etched border portions of said inert flow spacer frame with a thin layer of inert grease, whereby, when the resulting flow spacer frame is placed under pressure in face-to-face relation with a substantially identical flow spacer frame with a permselective membrane therebetween, a leak-free seal is obtained between the permselective membrane and the adjacent etched border portions of said flow spacer frames with the smooth inner peripheral edge surfaces of said flow spacer frames being substantially free from any tendency for the electrodeposition thereon of metal involved in the operation of the electrodialysis apparatus.

15. A method as set forth in claim 14 wherein the etching of said border portions of said flow spacer is effected chemically.

16. A method as set forth in claim 15 wherein said flow spacer frame is made of a plastic.

17. A method as set forth in claim 16 wherein said flow spacer is made of tetrafluoroethylene and the inert grease is a silicone grease.

18. The method of making a flow spacer frame for an electrodialysis apparatus comprising the steps of:
(a) chemically etching both sides of a plastic workpiece having the desired thickness and outer dimensions desired for the flow spacer frame,
(b) cutting out a window in the etched workpiece with the dimensions of the window being those desired for a flow space in the electrodialysis apparatus and leaving a border portion having inner peripheral edges and a substantial border portion surface surrounding the window,
(c) machining the inner peripheral edges of the border portion of the etched workpiece to provide smooth surfaces thereat, and (d) coating the etched border portion surfaces of said workpiece with a thin layer of inert grease, whereby, when the resulting flow spacer frame is placed under pressure in face-to-face relation with a substantially identical flow spacer frame with a permselective membrane therebetween, a leak-free seal is obtained between the perm-selective membrane and the adjacent etched border portion surfaces of said flow spacer frames with the smooth inner peripheral edge surfaces of said flow spacer frames being substantially free from any tendency for the electrodeposition thereon of metal involved in the operation of the electrodialysis apparatus.

19. A method as set forth in claim 18 wherein said workpiece is made of tetrafluorethylene and the inert grease is silicone grease.

20. A flow spacer frame for electrodialysis apparatus comprising, a plastic frame having etched border portion surfaces on both sides thereof surrounding a window, said window having dimensions of a size desired for the electrodialysis apparatus, and with the inner peripheral edge surfaces of the border portion surfaces which define the window being smooth, wherein the border portion surfaces of said plastic frame are chemically etched and coated with an inert grease, whereby, when said plastic frame is placed under pressure in face-to-face relation with a substantially identical flow spacer frame with an inert grease on the adjacent etched border portions of said frames, and with a permselective membrane therebetween, a leak-free seal is obtained between the adjacent etched border portion surfaces with the smooth inner peripheral edge surfaces of the border portion of the flow spacer frames being substantially free from any tendency for the electrodeposition thereon of metal that may be involved in the operation of the electrodialysis cell.

21. Electrodialysis apparatus comprising, a plurality of flow spacer frames with each of said flow spacer frames comprising a plastic frame having etched border portion surfaces on both sides thereof surrounding a window, said window having dimensions of a size desired for the electrodialysis apparatus, and with the inner peripheral edge surfaces of the border portion surfaces which define said window being smooth, wherein the border portion surfaces of each of said plastic frames is chemically etched, and wherein the material of which each of said plastic frames is made is tetrafluorethylene, said flow spacer frames being assembled in a closely packed closed system stack with a silicone grease on the etched border portion surfaces thereof to form the various cell compartments of the electrodialysis apparatus with the thickness of each of the flow spacer frames being in accordance with the depth desired for the respective cell compartments, whereby, when each of said flow spacer frame is placed under pressure in face-to-face relation with a substantially identical flow spacer frame with a permselective membrane therebetween, a leak-free seal is obtained between the adjacent etched border portion surfaces with the smooth inner peripheral edge surfaces of the border portion of the flow spacer frames being substantially free of any tendency for the electrodeposition thereon of metal that may be involved in the operation of the electrodialysis cell.

22. In electrodialysis apparatus comprising fluid containing cells formed of alternate membranes and frame membranes having border surfaces and stacked and pressed together in face-to-face relation to form a consolidated apparatus, the improvement wherein the border surfaces of adjacent frame members are etched and coated with an inert grease for precluding leakage or seepage of fluid between and from said cells of said apparatus.

23. In electrodialysis apparatus as set forth in claim 22 wherein said frame members are made of plastic.

24. In electrodialysis apparatus as set forth in claim 22 wherein said frame members are made of tetrafluoroethylene and said inert grease is silicone grease.

* * * * *